Patented July 14, 1936

2,047,598

UNITED STATES PATENT OFFICE 2,047,598

CELLULOSE DERIVATIVE COMPOSITIONS

Paul L. Salzberg and Frederick M. Meigs, Wilmington, Del., assignors to E. I. du Pont de Nemours & Company, Wilmington, Del., a corporation of Delaware No Drawing. Application April 13, 1932, Serial No. 605,111

1 Claim. (Cl. 106—40)

This invention relates to new cellulose derivative compositions, and more particularly, to such compositions including organic fluorine compounds.

Cellulose derivative coating compositions for use as brushing or spraying lacquers, enamels, and the like, generally comprise (1) active solvents (both high and low boiling), (2) non-solvent diluents, (3) softeners, (4) miscellaneous modifying agents, such as fire retardants, antioxidants, oils and resins. Cellulose derivative plastic compositions are essentially the same in composition except that the solvents and diluents are greatly reduced in proportion, or even completely eliminated. The present invention concerns the solvents, diluents and softeners used in cellulose derivative compositions. To be satisfactory, these components must possess the following properties:

1. Freedom from color;
2. Freedom from objectionable odor;
3. Compatibility with all the other components;
4. Chemical inertness, particularly toward hydrolytic reagents such as the pigment zinc oxide;
5. Low inflammability.

Besides the above properties, the active solvents must also have the following properties:

A—Low boiling active solvents
1. Active solvent power for cellulose derivatives;
2. A boiling point in the range of from 60–140° C., preferably around 100° C.

B—High boiling active solvents
1. Active solvent power for cellulose derivatives;
2. A boiling point in the range of from 160–210° C.;
3. A proper evaporation rate for satisfactory smoothing of the film during the final flow.

The diluents must contain the following additional properties:
1. Cheapness;
2. A satisfactory evaporation rate so that the cellulose derivative does not precipitate out of the solution while the film is drying due to increase in concentration of the non-solvent in the film.

The softeners must possess the following additional properties:
1. High compatibility with the cellulose derivative;
2. A very low vapor pressure so that films from the composition will retain their flexibility substantially indefinitely.

In the development of the art, practically every type of organic compound has been used for one or more of the purposes outlined above, including various chlorinated and, in some cases, brominated organic compounds. For example, chlorinated compounds such as chloroform, carbon tetrachloride, acetylene tetrachloride, and others have been used extensively as solvents, although within the last few years these compounds have been largely replaced by alcohol-ester or -ether mixtures, ketones, et cetera, chiefly because of the instability and toxicity of the chlorinated compounds and the resultant industrial hazard. Hereinafter, the term "halogenated" will be used to include chlorinated and brominated products as distinguished from fluorinated products, with which this invention is particularly concerned. Various halogenated compounds have also been employed as diluents, such as chlorobenzene and ethylene dichloride, due to their lower inflammability, and hexachloroethane has also been used as a softener, although the instability and toxicity of this compound more than offset its advantages, as is generally the case with nearly all highly halogenated compounds.

An object of the present invention is to provide a new class of solvents, diluents, and softeners of improved stability or inertness toward the various ingredients of cellulose derivative compositions, and of low inflammability, and in the case of solvents and plasticizers of high solvent power and compatability. Other objects of the invention will be apparent from the description given hereinafter.

The above objects are accomplished according to the present invention broadly by the use of fluorinated compounds in cellulose derivative compositions as solvents, diluents, and/or plasticizers.

Particularly suitable specific compounds under the various types of components of cellulose derivative compositions are given below to illustrate the broad application of the present invention:

1. ACTIVE SOLVENTS

A—Low Boiling

1. Mixed fluorinated halogenated hydrocarbons of the lower aliphatic series

| | Boiling point |
|---|---|
| Monofluorothichloroethane | 103° C. |
| Difluorodichloroethane | 60° C. |
| Difluorobromoethane | 57° C. |

2. Fluoro-esters of lower fatty acids

| | Boiling point |
|---|---|
| Difluoroethylacetate | 106° C. |
| Ethyldifluoroacetate | 99.2° C. |
| Fuoroethyl acetate | 119.3° C. |
| Ethylfluoroacetate | 120° C. |
| Ethylfluorodichloroacetate | 130° C. |
| Ethyltrifluoroacetate | 62° C. |

B—High Boiling

| | |
|---|---|
| Ethyl-p-fluorobenzoate | 210° C. |
| o-Fluoronitrobenzene | 205° C. |
| p-Fluoronitrobenzene | 205° C. |
| m-Nitrophenylfluoroform | 201.5° C. |
| 6-nitro-2-fluorotoluol | 218° C. |
| Trifluoromethylcyclohexanone | 173–4° C. |

2. NON-SOLVENT DILUENTS

| | |
|---|---|
| Fluorobenzene | 85° C. |
| Fluorochlorobenzene | 130–1° C. |
| o-Fluorotoluene | 114–5° C. |
| p-Fluorotoluene | 116–7° C. |
| 1,3-dimethyl-4-fluorobenzene | 143° C. |
| Phenylfluoroform | 103° C. |

3. SOFTENERS

| | Melting point |
|---|---|
| p-Fluoroacetanilide | 151° C. |
| m-Acetaminophenylfluoroform | 103° C. |
| o-Fluoroacetanilide | 80° C. |
| 4-fluorotoluenesulfonamide | 155° C. |

The following examples give cellulose derivative compositions illustrating the present invention:

EXAMPLE 1
*A clear solution*

| | Parts |
|---|---|
| Pyroxylin | 10 |
| Monofluorotrichloroethane | 90 |
| Ethyl alcohol | 5 |

EXAMPLE 2
*A clear solution*

| | Parts |
|---|---|
| Cellulose acetate | 10 |
| Dichlorodifluoroethane | 90 |

EXAMPLE 3
*A clear solution*

| | Parts |
|---|---|
| Pyroxylin | 10 |
| Difluorobromoethane | 90 |

EXAMPLE 4
*A clear lacquer*

| | Parts |
|---|---|
| Pyroxylin | 10 |
| Damar resin | 7 |
| Dibutyl phthalate | 3 |
| Monofluorotrichloroethane | 25 |
| Ethyl alcohol | 12 |
| Butyl alcohol | 8 |
| Ethyl lactate | 2 |
| Butyl acetate | 5 |
| Toluol | 8 |
| Gasoline | 20 |

The monofluorotrichloroethane in the above formula constitutes the active solvent for the pyroxylin. Flow-outs of this lacquer dry in 30–45 minutes with the formation of a smooth, clear film having a good gloss. As in any of the above examples, a pigmented lacquer may be obtained by incorporating pigments in the composition.

The following example illustrates a white enamel employing the lacquer, in this example, the Damar resin having been dissolved in toluol and ethyl alcohol and then pigmented with barium sulphate and then mixed with the pyroxylin base:—

EXAMPLE 5
*A white enamel*

| | Parts |
|---|---|
| Pyroxylin | 10 |
| Damar resin | 7 |
| Barium sulphate | 15 |
| Dibutyl phthalate | 3 |
| Monofluorotrichloroethane | 25 |
| Ethyl alcohol | 12 |
| Butyl alcohol | 8 |
| Ethyl lactate | 2 |
| Butyl acetate | 5 |
| Toluol | 8 |
| Gasoline | 20 |

EXAMPLE 6
*A clear lacquer*

| | Parts |
|---|---|
| Cellulose acetate | 10 |
| m-Acetoaminophenylfluoroform | 10 |
| Ethyl acetate | 60 |
| Ethyl alcohol | 10 |

It should be noted that the softener, m-acetoaminophenylfluoroform, does not separate from the cellulose acetate in films deposited from the above lacquer, despite the very high percentage of softener in the composition.

EXAMPLE 7
*A clear lacquer*

| | Parts |
|---|---|
| Pyroxylin | 10 |
| Alcohol | 10 |
| Butyl alcohol | 15 |
| Ethyl acetate | 25 |
| Dibutyl phthalate | 2 |
| Ethyl lactate | 1 |
| Fluorobenzene | 25 |

It will be understood that the above examples merely illustrate specific embodiments of the invention which embraces in its broader aspects the use of organic fluorine compounds as solvents, diluents, and/or softeners in cellulose derivative compositions. In any of the above examples ethyl, benzyl, or crotyl cellulose, cellulose propionate, butyrate, acetabutyrate, acetonitrate, or crotonate may be substituted for the cellulose derivative specified. As will be apparent to those skilled in the art a wide variety of modifying agents such as resins, including rosin, ester gum, and resins of the polyhydric alcohol-polybasic acid type may be included, as well as other softeners, anti-oxidants, fillers, and pigments.

The use of organic fluorine compounds in cellulose derivative compositions is extremely advantageous because of their high solvent power (except in the case of diluents), their stability or inertness towards chemical reagents, and their low inflammability.

The high solvent action of organic fluorine compounds for cellulose derivatives is shown by a comparison of the dilution ratios for solutions of cellulose acetate in the fluorochloroethanes and in acetylene tetrachloride which is known to be an extremely active solvent for cellulose derivatives. The test solutions contained 10 cc. of solvent, 3 cc. of ethyl alcohol and 0.5 grams of cellulose acetate. The results of the tests are given in the following table:—

| Solvent | Gasoline required to cause precipitation |
|---|---|
| 1. Acetylene tetrachloride | 2.0 cc. |
| 2. Monofluorotrichloroethane | 5.0 cc. |
| 3. Difluorodichloroethane | 5.3 cc. |

The excellent solvent action of the fluorochloroethanes is also shown by a comparison of viscosity measurements on solutions of cellulose acetate with a solution of like concentration in acetylene tetrachloride. The test solutions were equivalent to those used in the preceding example.

| Solvent | Viscosity in poises |
|---|---|
| 1. Acetylene tetrachloride | 2.25 |
| 2. Monofluorotrichloroethane | 1.9 |
| 3. Difluorodichloroethane | 1.4 |

In addition, viscosity measurements on comparative solutions have also shown that phenyl fluoride is a better diluent (gives solutions of lower viscosity) than either benzene or chlorobenzene. Thus when 20 g. samples of a 25% solution of pyroxylin in ethyl acetate and ethyl alcohol were diluted with equal volumes of the three solvents, the viscosities of the solutions were as follows:

| Volume of diluent | Viscosity in poises | | |
|---|---|---|---|
| | Benzene | Chlorobenzene | Fluorobenzene |
| .0 cc. | 10.7 | | |
| 1.0 cc. | 8.84 | 8.84 | 7.55 |
| 2.0 cc. | 6.27 | 6.2 | 5.50 |
| 4.0 cc. | 3.70 | 3.4 | 5.70 |

A lower degree of inflammability is inherent in compounds containing halogen atoms as compared with the corresponding hydrogen compounds. Gasoline flashes below 0° F., while difluorodichloroethane, which has an even lower boiling point (b.p. 60° C.) than gasoline, flashes at 37° F. Benzene (b.p. 78° C.) flashes at —15° F. and fluorobenzene, containing only one halogen atom and boiling only a few degrees higher (b.p. 85° C.), flashes at 14° F. Low inflammability decreases the industrial fire hazards of cellulose ester or ether compositions containing organic fluorine compounds.

In regard to stability, it is known that the fluorine carbon bond is more resistant toward hydrolysis than other halogen carbon bonds and that the introduction of a fluorine atom into a molecule has a tendency to increase the resistance toward hydrolysis of other halogen atoms in the same molecule. One of the chief disadvantages of acetylene tetrachloride and of other chlorinated solvents is their relative instability and high toxicity. While it has not been absolutely established, there is some evidence that toxicity is inversely related to stability. This is at least true in so far as a comparison of the organic fluorine compounds included within the scope of this invention is concerned, as compared with the corresponding chlorine compounds. A striking example of the effect of fluorine atoms on the stability and toxicity of a compound is found in the case of difluorodichloromethane which is extremely stable toward nearly all reagents and is nontoxic, whereas the closely related substance, carbon tetrachloride, is not only relatively unstable, particularly toward alkaline reagents, but is also highly toxic.

It will be seen that by the present invention a whole new class of cellulose derivative composition components has been provided which are exceptionally non-inflammable and possess highly advantageous properties for use in cellulose derivative lacquers, dopes, plastics, and the like.

As many apparently widely different embodiments of this invention may be made without departing from the spirit and scope thereof, it is to be understood that the invention is not limited to the specific embodiments thereof except as defined in the appended claim.

We claim:

A composition comprising a cellulose derivative and, as a low boiling solvent therefor, difluorodichloroethane.

PAUL L. SALZBERG.
FREDERICK M. MEIGS.